United States Patent [19]
Cody

[11] Patent Number: 5,487,319
[45] Date of Patent: Jan. 30, 1996

[54] SAW GUIDE APPARATUS

[76] Inventor: Delbert J. Cody, 501 6th St., Cody, Wyo. 82414

[21] Appl. No.: 139,761

[22] Filed: Oct. 22, 1993

[51] Int. Cl.⁶ .................................................. B26B 29/06
[52] U.S. Cl. .............................. 83/745; 83/574; 30/293; 33/538; 33/640; 269/1; 269/319
[58] Field of Search ................ 83/745, 743; 144/286 R, 144/286 A, 287; 269/291, 298–301, 303, 304, 318–320, 1; 108/69, 137, 143; 33/534, 538, 640, 641; 30/289, 293

[56] References Cited

U.S. PATENT DOCUMENTS

| | | | |
|---|---|---|---|
| 1,043,950 | 11/1912 | Martin | 108/137 X |
| 2,680,458 | 6/1954 | Grammer | 83/581 X |
| 2,768,043 | 10/1956 | Kristoff et al. | 108/137 X |
| 2,823,709 | 2/1958 | Konieczka | 83/745 |
| 3,130,758 | 4/1964 | McKinley | 83/574 |
| 4,155,312 | 5/1979 | Thokildson | 108/137 |
| 4,327,619 | 5/1982 | McNamee, Jr. | 83/581 X |
| 4,608,898 | 9/1986 | Volk | 83/745 |
| 4,726,405 | 2/1988 | Bassett | 269/303 X |
| 4,817,693 | 4/1989 | Schuler | 144/287 X |
| 5,187,877 | 2/1993 | Jory et al. | 33/640 |
| 5,274,902 | 1/1994 | Rowley | 33/534 X |

FOREIGN PATENT DOCUMENTS 868062 12/1953 Germany .................. 108/69

*Primary Examiner*—Rinaldi I. Rada
*Assistant Examiner*—Clark F. Dexter

[57] ABSTRACT

A saw guide is arranged to include first and second gauge sectors pivotally mounted relative to first and second table plates that are telescopingly mounted relative to one another. A fence member extends along the first and second table plates for guidance of a saw blade therealong.

3 Claims, 4 Drawing Sheets

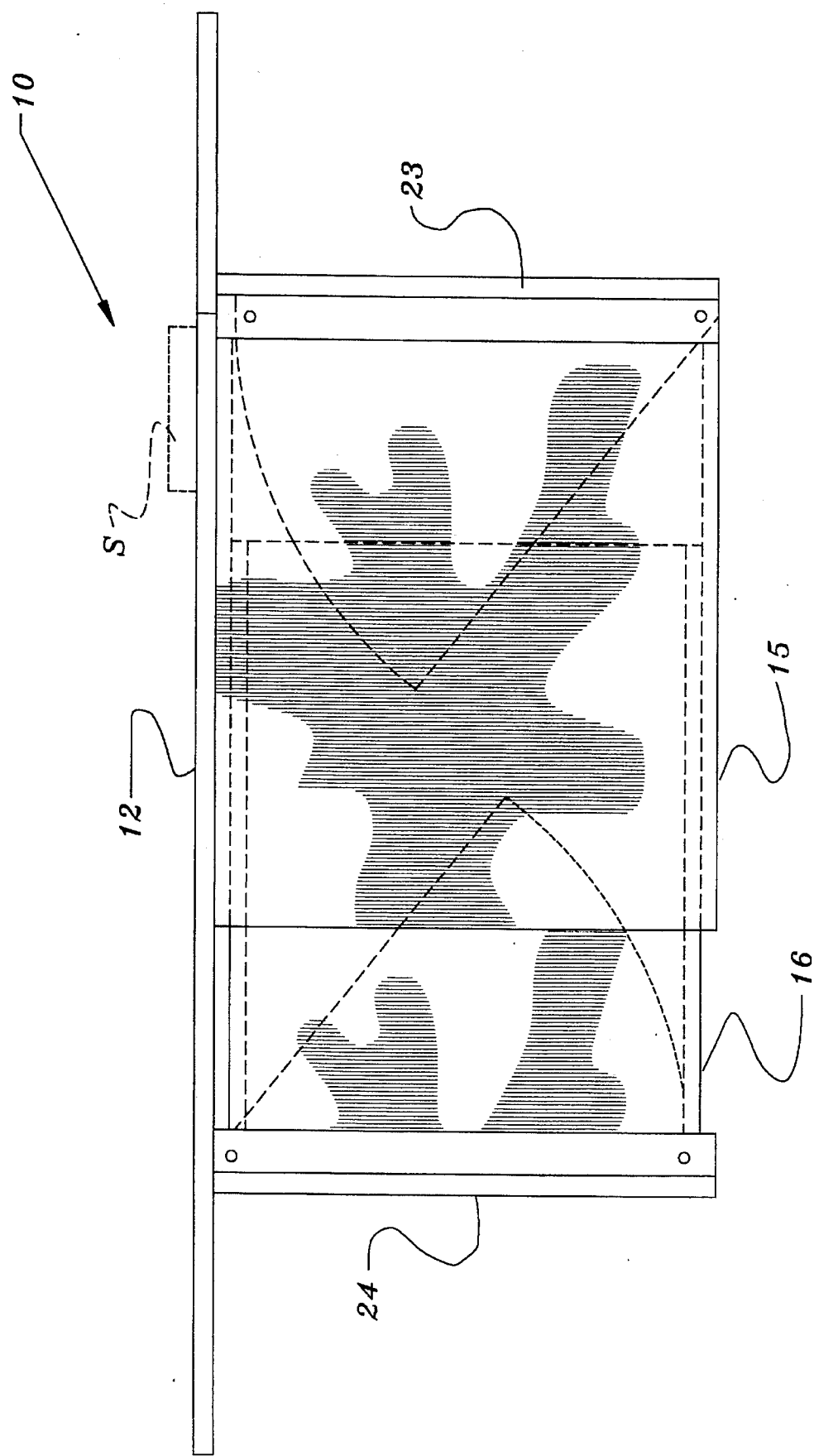

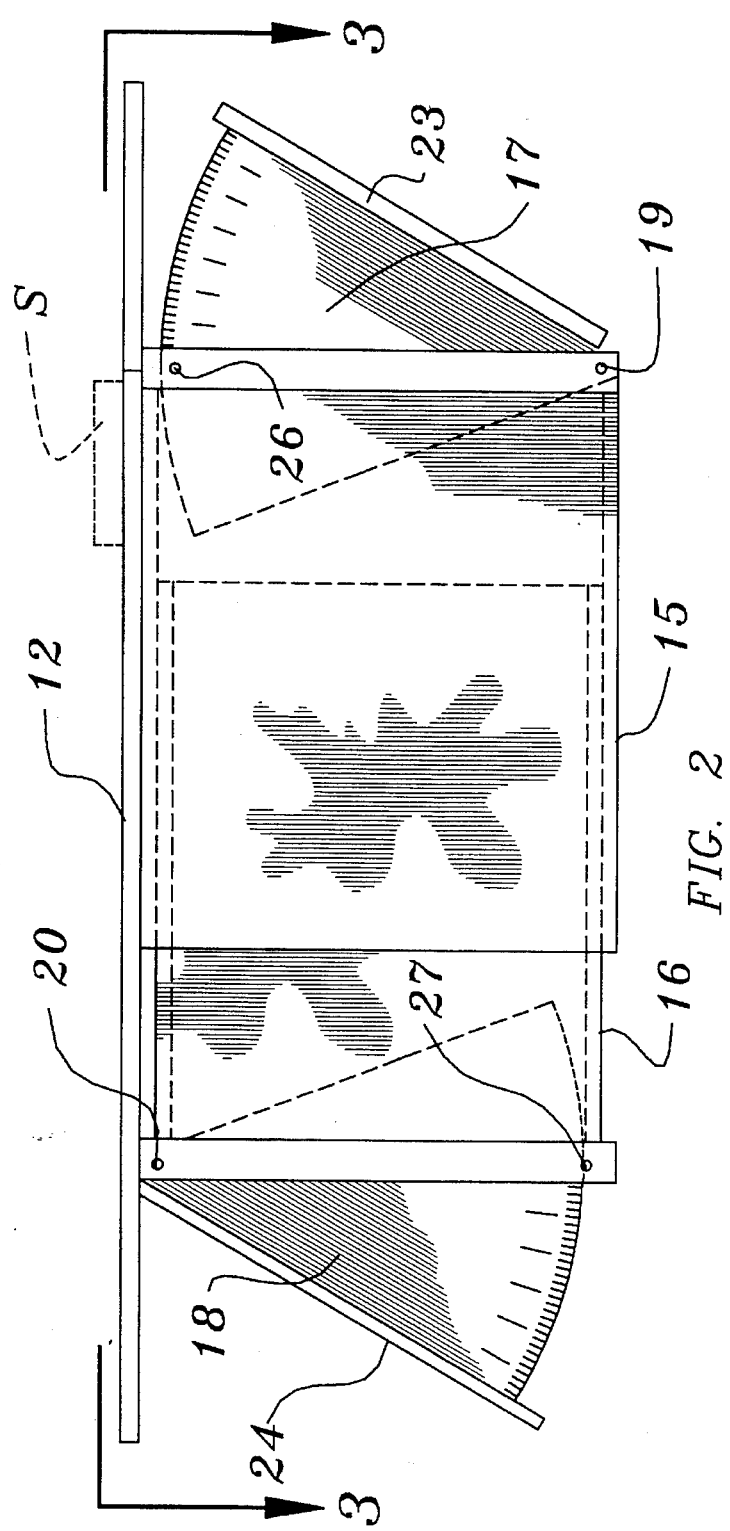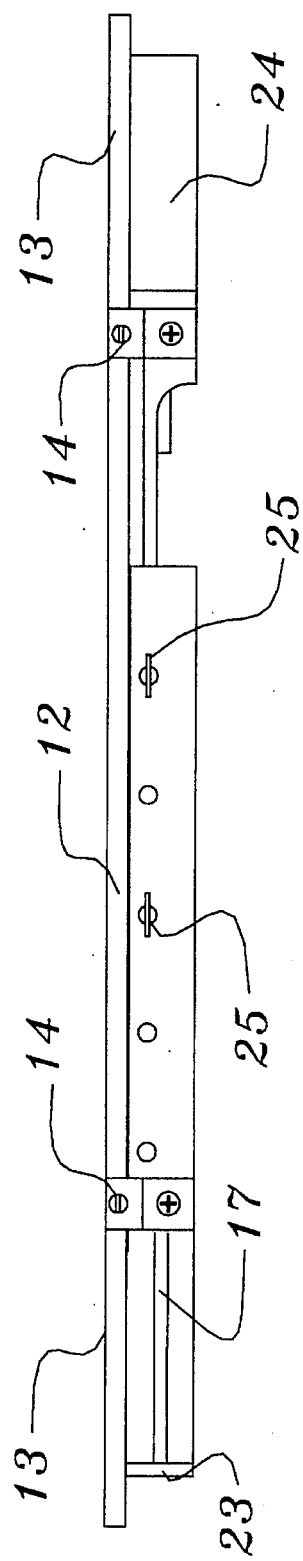

5,487,319

SAW GUIDE APPARATUS

BACKGROUND OF THE INVENTION

1. Field of the Invention

The field of invention relates to saw guide apparatus, and more particularly pertains to a new and improved saw guide apparatus wherein the same is arranged to permit positioning within a laminated joist construction.

2. Description of the Prior Art

Saw guide apparatus of various types have been indicated in the prior art and exemplified by the U.S. Pat. Nos. 3,961,548; 4,016,649; 4,854,207; and 4,095,632.

The instant invention attempts to overcome deficiencies of the prior art by providing for a guide structure arranged for ease of use as well as effectiveness in construction relative to laminated joist construction and in this respect, the present invention substantially fulfills this need.

SUMMARY OF THE INVENTION

In view of the foregoing disadvantages inherent in the known types of saw guide apparatus now present in the prior art, the present invention provides a saw guide apparatus providing for telescoping tables, each having a respective gauge sector to permit angular orientation of the apparatus within a laminated joist construction. As such, the general purpose of the present invention, which will be described subsequently in greater detail, is to provide a new and improved saw guide apparatus which has all the advantages of the prior art saw guide apparatus and none of the disadvantages.

To attain this, the present invention provides a saw guide arranged for reception within a laminated joist, to include first and second gauge sectors pivotally mounted relative to first and second table plates that are telescopingly mounted relative to one another. A fence member extends along the first and second table plates for guidance of a saw blade therealong.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved saw guide apparatus which has all the advantages of the prior art saw guide apparatus and none of the disadvantages.

It is another object of the present invention to provide a new and improved saw guide apparatus which may be easily and efficiently manufactured and marketed.

It is a further object of the present invention to provide a new and improved saw guide apparatus which is of a durable and reliable construction.

An even further object of the present invention is to provide a new and improved saw guide apparatus which is susceptible of a low cost of manufacture with regard to both materials and labor, and which accordingly is then susceptible of low prices of sale to the consuming public, thereby making such saw guide apparatus economically available to the buying public.

Still yet another object of the present invention is to provide a new and improved saw guide apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an orthographic top view of the invention.

FIG. 2 is an orthographic bottom view of the invention.

FIG. 3 is an orthographic end view taken along the lines 3—3 of FIG. 2.

DESCRIPTION OF THE PREFERRED EMBODIMENT

Figure 4:
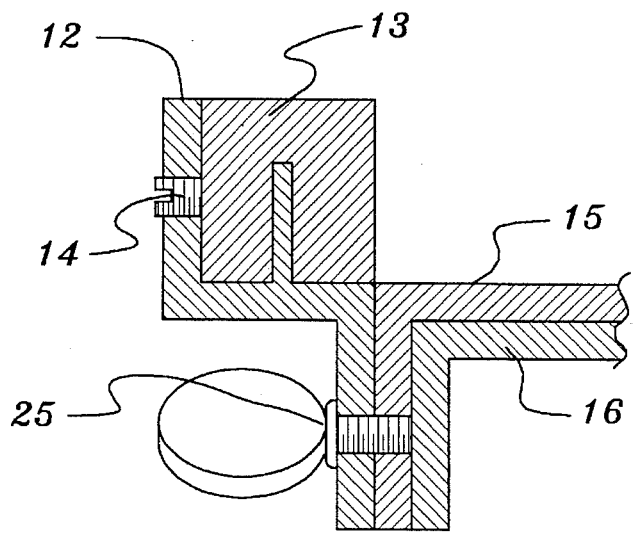
FIG. 4 is an orthographic view of a plate fastener engaging the first and second table plates.

With reference now to the drawings, and in particular to FIGS. 1 to 7 thereof, a new and improved saw guide apparatus embodying the principles and concepts of the present invention and generally designated by the reference numerals 10 and 10a will be described.

Figure 5:
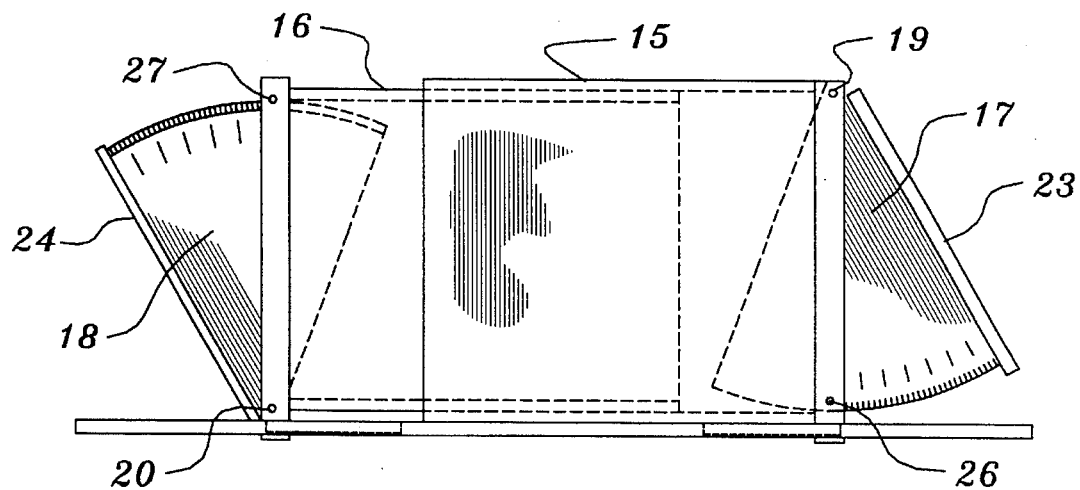
FIG. 5 is an orthographic bottom view of the invention.
Figure 6:
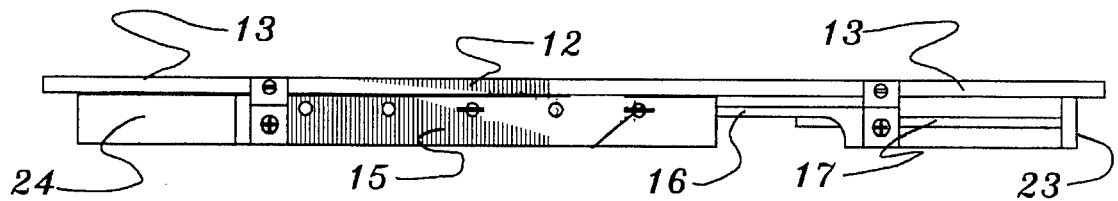
FIG. 6 is an orthographic end view of the invention of FIG. 5.

More specifically, the saw guide apparatus 10 is arranged (shown in FIG. 1) to accommodate a saw blades along the expandable fence 12 or along one of the first and second sector abutment plates 23 and 24. In this manner, rectilinear or angular cuts of a workpiece is available. The expandable fence 12 includes telescoping flanges 13 secured to the fence 12 by fence lock fasteners 14 permitting sliding of the telescoping flanges 13 relative to the fence 12. First and second table plates 15 and 16 are arranged in a telescoping relationship, such that the second table plate is arranged for reception within the first table plate, and wherein table plate fasteners 25 are threadedly directed through the first table plate 15 to engage the second table plate to lock the table plates in a desired telescoping relationship relative to one another. First gauge sector 17 is pivotally mounted about a first pivot axle 19 to the first table plate 15 spaced from the second table plate, with a second gauge sector 18 pivotally mounted about a second pivot axle 20 to the second table plate 16 spaced from the first table plate 15. The first gauge sector and the second gauge sector are both of a semi-annular pie-shaped configuration, having respective first and second abutment plates 23 and 24 arranged to engage respective outer ends of the first and second table plates 15 and 16 when in a respective configuration, such as indicated in the FIG. 1, permitting projection of the gauge sectors, such as indicated in FIG. 5. First and second lock fasteners 26 and 27 directed through the first and second table plates are arranged to engage the respective first and second gauge sectors for their fixed locking relative to one another.

Figure 7:
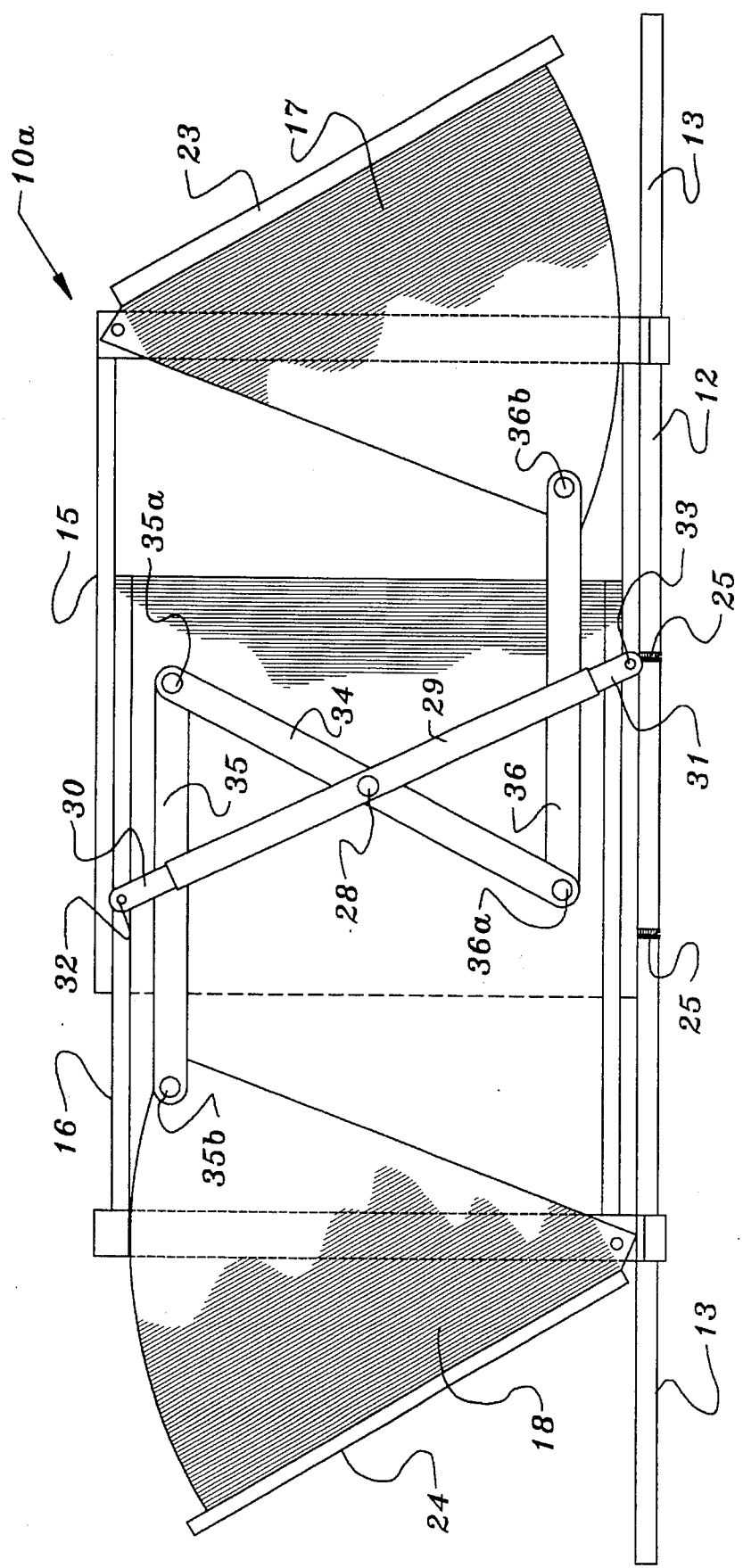
FIG. 7 is an orthographic bottom view of a modified construction of the instant invention.

FIG. 7 indicates a modified construction having a central axle 28 positioned within the second table plate, with a central tube 29 pivotally mounted medially of the central tube, such that a first and second link 30 and 31 are slidably received within the central tube first and second ends, and having first and second links including first and second link pivot axles 32 and 33 respectively pivotally mounted to respective first and second table plates, as illustrated in FIG. 7. In this manner, the table plates are insured of alignment relative to one another by the central tube 29. Further, the central link 34 pivotally mounted medially of itself to the central axle 28 includes at its respective first and second ends, first and second guide links 35 and 36 pivotally mounted to respective central link 34 about respective first and second link first axles 35a and 36a. The first and second guide links 35 and 36 have at their second ends first and second link second pivot axles 35b and 36b mounting the respective first and second guide links 35 and 36 pivotally to the respective second and first gauge sectors 18 and 17 to provide simultaneous projection of the gauge sectors relative to the respective second and first table plates 16 and 15. Accordingly, the apparatus 10a permits the simultaneous projection and retraction of the gauge sectors relative to the apparatus in use.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A saw guide apparatus, comprising, a first table plate and; an expandable fence mounted to the first table plate, with the expandable fence having a fence first end and a fence second end, the fence first end and the fence second end each receive telescopingly a telescoping flange, a second table plate parallel and reciprocatably mounted to the first table plate with the first table plate parallel to the expandable fence, and a first gauge sector of a pie-shaped configuration mounted about a first pivot axle within the first table plate, with the first gauge sector having a first sector abutment plate mounted to a surface of the first gauge sector, and a second gauge sector having a pie-shaped configuration and a second pivot axle pivotally mounting the second gauge sector to the second table plate, with the second gauge sector having a second sector abutment plate mounted thereon.

2. An apparatus as set forth in claim 1 including a central axle mounted to the second table plate, a central link pivotally mounted medially of the central link to the central axle, the central link having a link first end and a link second end, the link first end including a first guide link pivotally mounted about a first link first pivot axle to the central link, and a second guide link pivotally mounted to the central link second end about a second link first pivot axle, and the first guide link having a first guide link second pivot axle pivotally mounting the first guide link to the second gauge sector, and the second guide link having a second link second pivot axle pivotally mounting the second guide link to the first gauge sector, such that the first sector abutment plate and the second sector abutment plate are maintained in a parallel relationship relative to one another during pivoting one of said gauge sector.

3. An apparatus as set forth in claim 2 including a plurality of table plate fasteners directed through the first table plate and releasably engaging the second table plate to secure the first table plate and the second table plate together in a telescoping relationship.

* * * * *